(12) United States Patent
Matsumoto (10) Patent No.: US 10,372,644 B2
(45) Date of Patent: Aug. 6, 2019

(54) PROGRAMMABLE CONTROLLER

(71) Applicant: FANUC CORPORATION, Yamanashi (JP)

(72) Inventor: Akihiro Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/877,507

(22) Filed: Jan. 23, 2018

(65) Prior Publication Data

US 2018/0225245 A1    Aug. 9, 2018

(30) Foreign Application Priority Data

Feb. 3, 2017  (JP) ................................. 2017-018130

(51) Int. Cl.
  *G06F 13/42*   (2006.01)
  *G06F 13/376*  (2006.01)
(52) U.S. Cl.
  CPC ........ *G06F 13/376* (2013.01); *G06F 13/4204* (2013.01); *G06F 13/4291* (2013.01)
(58) Field of Classification Search
  CPC ...................................................... G06F 13/42
  See application file for complete search history.

(56) References Cited

U.S. PATENT DOCUMENTS

| | | | |
|---|---|---|---|
| 6,243,781 B1 * | 6/2001 | Gandhi ............... | G06F 13/4036 710/313 |
| 6,477,587 B1 * | 11/2002 | Isoda ................ | H04L 12/40123 710/20 |
| 7,302,564 B2 * | 11/2007 | Berlin ................ | H04L 63/0442 713/151 |
| 8,918,573 B2 * | 12/2014 | Gregg ................ | G06F 13/4027 710/313 |
| 9,842,074 B2 * | 12/2017 | Raghavan ............. | G06F 13/362 |

FOREIGN PATENT DOCUMENTS

| | | |
|---|---|---|
| JP | S63-36304 A | 2/1988 |
| JP | S63-36403 A | 2/1988 |
| JP | H6-242819 A | 9/1994 |
| JP | 2005-131775 A | 5/2005 |

OTHER PUBLICATIONS

Office Action in JP Application No. 2017-018130, dated Sep. 25, 2018, 4pp.

* cited by examiner

*Primary Examiner* — Brian T Misiura
(74) *Attorney, Agent, or Firm* — Hauptman Ham, LLP

(57) ABSTRACT

Provided is a programmable controller capable of simplifying handshake processing between control devices. The programmable controller, which performs the handshake processing in conjunction with a reception-side device, is provided with an output signal area in which a signal to be output to the reception-side device is held, an input signal area in which a signal output by the reception-side device is held, a sequential program execution part configured to execute a sequential program, an output signal temporary area in which an output signal from the sequential program is held, and a handshake processing part configured to copy a signal state of the output signal temporary area in the output signal area and hold the signal state of the output signal area so that the input signal area is notified of a completion signal.

7 Claims, 14 Drawing Sheets

PROGRAMMABLE CONTROLLER

RELATED APPLICATIONS

The present application claims priority to Japanese Patent Application No. 2017-018130 filed on Feb. 3, 2017, the disclosure of which is hereby incorporated by reference herein in its entirety.

BACKGROUND OF THE INVENTION

Field of the Invention

The present invention relates to a programmable controller, and more particularly, to a programmable controller capable of simplifying handshake processing between control devices.

Description of the Related Art

Figure 1:
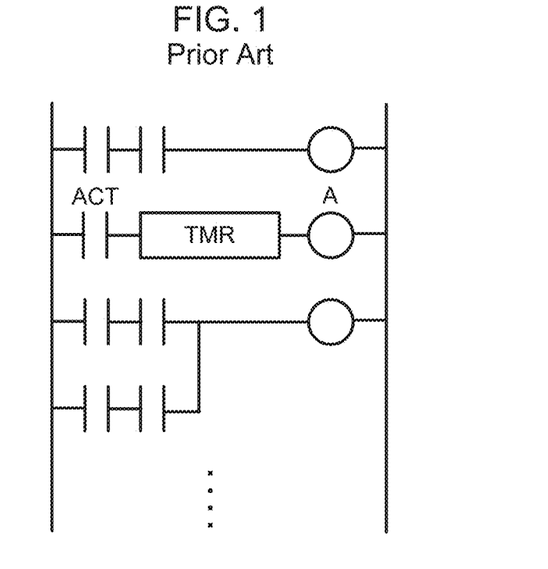
FIG. 1 is a diagram showing transmission/reception processing (timer processing) in a conventional programmable controller.
Figure 2:
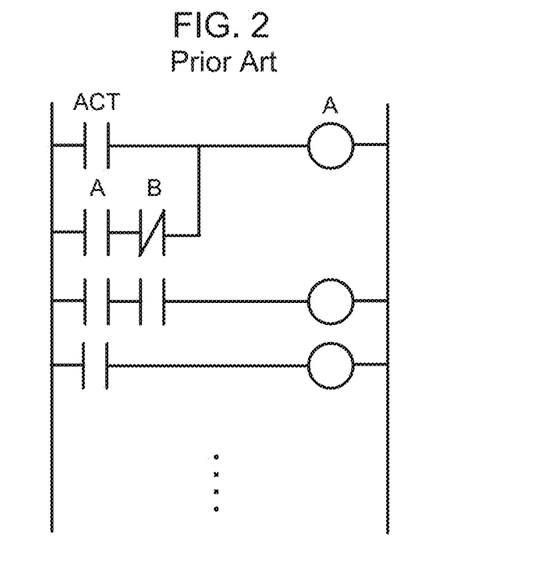
FIG. 2 is a diagram showing transmission/reception processing (handshake processing) in the conventional programmable controller.

Conventionally, in performing communication between a plurality of control devices of a programmable controller, various methods are used for reliable delivery of signals and data. For example, as shown in FIG. 1, there is a method in which a period of time such that a reception-side device can reliably receive a signal (A) is estimated in advance and a transmission-side device holds the output state of the signal in response to a timer instruction or the like during that time period. Moreover, there is a method in which transmission and reception devices reciprocally determine a request signal (A) and a completion signal (B) for handshake in advance and perform handshake processing using these signals, as shown in FIG. 2. Japanese Patent Application Laid-Open No. 2005-131775 discloses an example of such handshake processing.

In these conventional methods, however, a user used to have to create the timer instruction, sequential processing for handshake, and the like by him/herself, thus entailing complicated operations and a large number of man-hours.

Furthermore, there are problems that addition of these steps of processing to a program complicates the program and reduces its readability and that the scan time of a sequential program is delayed. Moreover, in a configuration in which a signal state such as that shown in FIG. 1 is held for a certain period of time, there is a problem that the time must be set with an allowance so that the reception-side device can reliably receive the signal, thus lengthening the processing time.

SUMMARY OF THE INVENTION

The present invention has been made in consideration of these problems and its object is to provide a programmable controller capable of simplifying handshake processing between control devices.

A programmable controller according to one embodiment of the present invention is a programmable controller configured to perform handshake processing in conjunction with a reception-side device and comprising an output signal area in which a signal to be output to the reception-side device is held, an input signal area in which a signal output by the reception-side device is held, a sequential program execution part configured to execute a sequential program, an output signal temporary area in which an output signal from the sequential program is held, and a handshake processing part configured to copy a signal state of the output signal temporary area in the output signal area and hold the signal state of the output signal area so that the input signal area is notified of a completion signal.

In a programmable controller according to another embodiment, the sequential program execution part changes the signal state of the output signal temporary area before the input signal area is notified of the completion signal after the signal state of the output signal temporary area is copied in the output signal area.

In a programmable controller according to another embodiment, the handshake processing part determines whether or not the output signal from the sequential program is a signal that requires handshake processing and causes the output signal to be held in the output signal temporary area if the output signal is a signal that requires the handshake processing.

In a programmable controller according to another embodiment, the handshake processing part causes the output signal from the sequential program to be held in the output signal area if the output signal is a signal that does not require the handshake processing.

In a programmable controller according to another embodiment, the handshake processing part copies the signal state of the output signal temporary area in the output signal area if the completion signal is not held in the input signal area.

According to the present invention, there can be provided a programmable controller capable of simplifying handshake processing between control devices.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

An embodiment of the present invention will now be described in comparison with the prior art with reference to the accompanying drawings.

Figure 3:
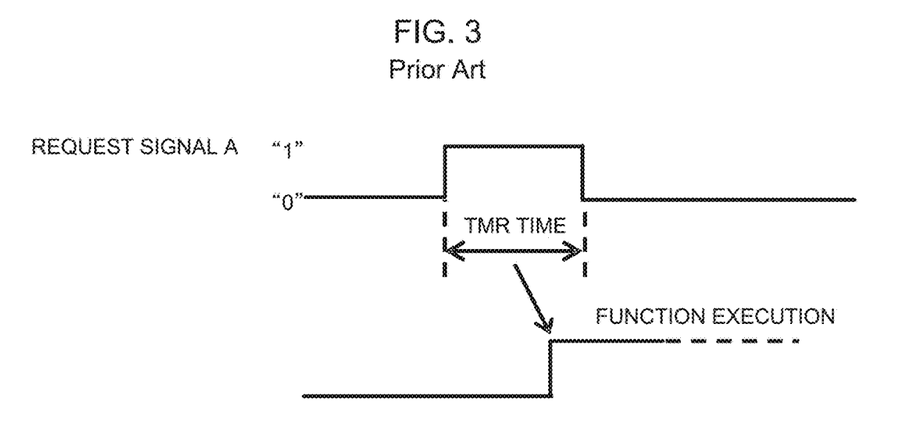
FIG. 3 is a time chart showing the transmission/reception processing (timer processing) in the conventional programmable controller.

An outline of the prior art will first be described with reference to FIGS. 3 to 5. FIG. 3 is a time chart showing an example of timer processing in conventional transmission and reception devices. First, a sequential program of a transmission-side device outputs a request signal A. The output of the request signal A is maintained for a period of time (TMR time) during which a reception-side device can reliably receive the signal. The reception-side device starts function execution when it detects the request signal A. The transmission-side device stops the output of the request signal A when the TMR time has elapsed.

Figure 4:
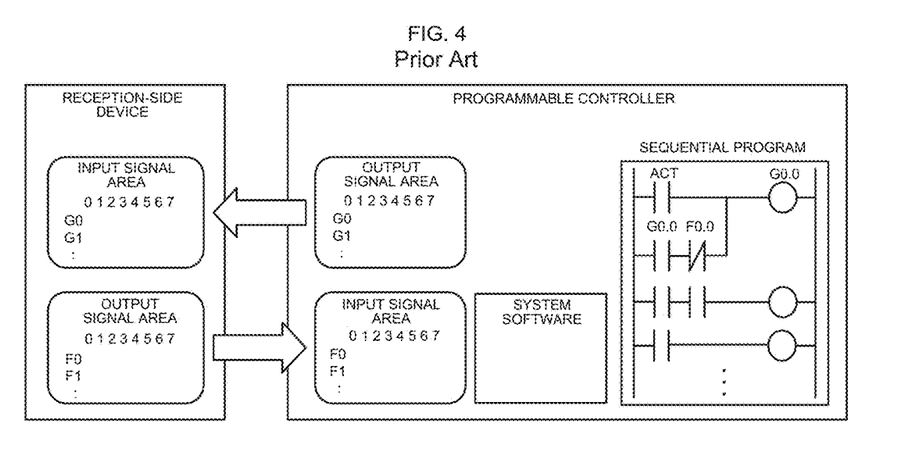
FIG. 4 is a block diagram showing the transmission/reception processing (handshake processing) in the conventional programmable controller.
Figure 5:
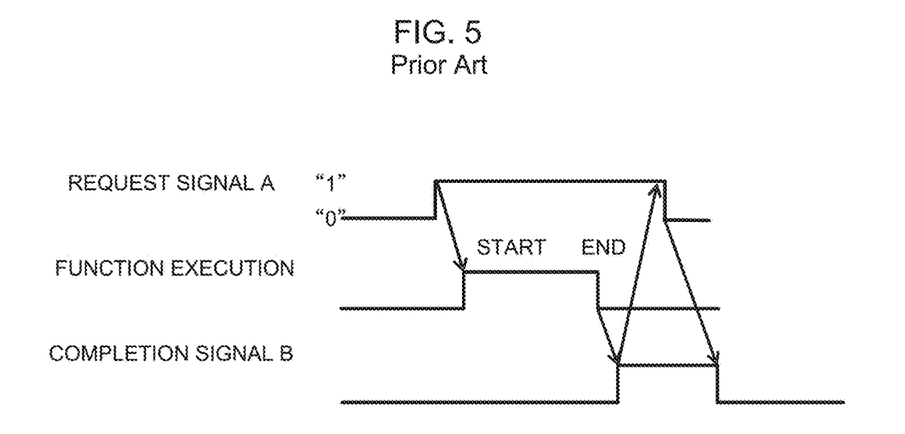
FIG. 5 is a time chart showing the transmission/reception processing (handshake processing) in the conventional programmable controller.

FIGS. 4 and 5 are a block diagram and a time chart, respectively, showing an example of handshake processing in the conventional transmission and reception devices. First, the transmission-side device outputs the request signal A (FIG. 5; G0.0 in FIG. 4). As this is done, the request signal A is written directly into an output signal area by the sequential program. Moreover, the output of the request signal A is maintained until completion of the function execution by the reception-side device can be confirmed. The reception-side device starts the function execution when it detects the request signal A. When the function execution ends, the reception-side device outputs a completion signal B. The sequential program of the transmission-side device stops the output of the request signal A when it detects that the completion signal B is written into an input signal area. The reception-side device stops the output of the completion signal B when it detects the stop of the output of the request signal A.

Thus, in the prior art, the sequential program of the transmission-side device is expected to hold the request signal A before the completion of the TMR time or the function execution becomes confirmable. This required time duration adversely affects the scan time of the sequential program. Moreover, since a timer and a dedicated circuit for the handshake processing are used, the structure of the sequential program is complicated.

Figure 6:
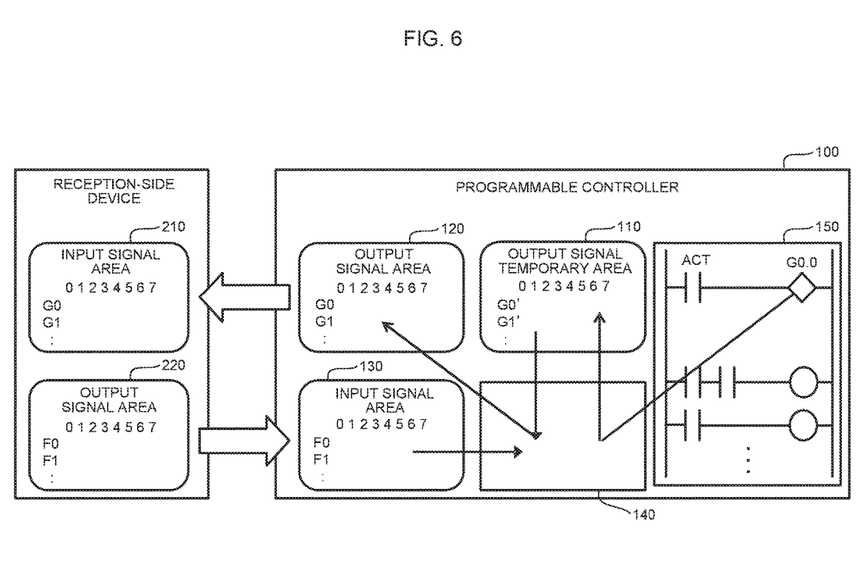
FIG. 6 is a block diagram showing the configurations of the programmable controller according to the embodiment of the present invention and a system comprising the programmable controller.

FIG. 6 is a block diagram of a system that comprises a programmable controller 100 according to the embodiment of the present invention. The programmable controller 100 is the transmission-side device. The reception-side device may be various apparatus, such as a programmable controller, numerical controller, or robot controller, which can communicates with the transmission-side device.

The programmable controller 100 comprises an output signal temporary area 110, output signal area 120, input signal area 130, handshake processing part 140, and sequential program execution part 150.

The sequential program execution part 150 reads the sequential program and sequentially executes nets described in the sequential program.

The output signal temporary area 110 is a storage area in which the request signal as a result of the execution of the sequential program is to be written.

The handshake processing part 140 executes the handshake processing related to data transmission and reception to and from the reception-side device. In the present embodiment, unlike in the prior art, the sequential program does not execute the handshake processing, but the handshake processing part 140 handles the handshake processing after the request signal is written into the output signal temporary area 110 by the sequential program execution part 150. The handshake processing part 140 may be typically mounted as one function of the system software of the programmable controller 100.

The output signal area 120 is a storage area in which the request signal output to the reception-side device is to be written. The request signal written in the output signal area 120 is reflected in an input signal area 210 of the reception-side device.

The input signal area 130 is a storage area in which the completion signal output by the reception-side device is to be input. The completion signal written in an output signal area 220 of the reception-side device is reflected in the input signal area 130.

The reception-side device comprises the input signal area 210 and the output signal area 220.

The input signal area 210 is a storage area in which the request signal output by the programmable controller 100 is to be input. The request signal written in the output signal area 120 of the programmable controller 100 is reflected in the input signal area 210.

The output signal area 220 is a storage area in which the completion signal output to the programmable controller 100 is to be written. The completion signal written in the output signal area 220 is reflected in the input signal area 130 of the programmable controller 100.

Figure 7:
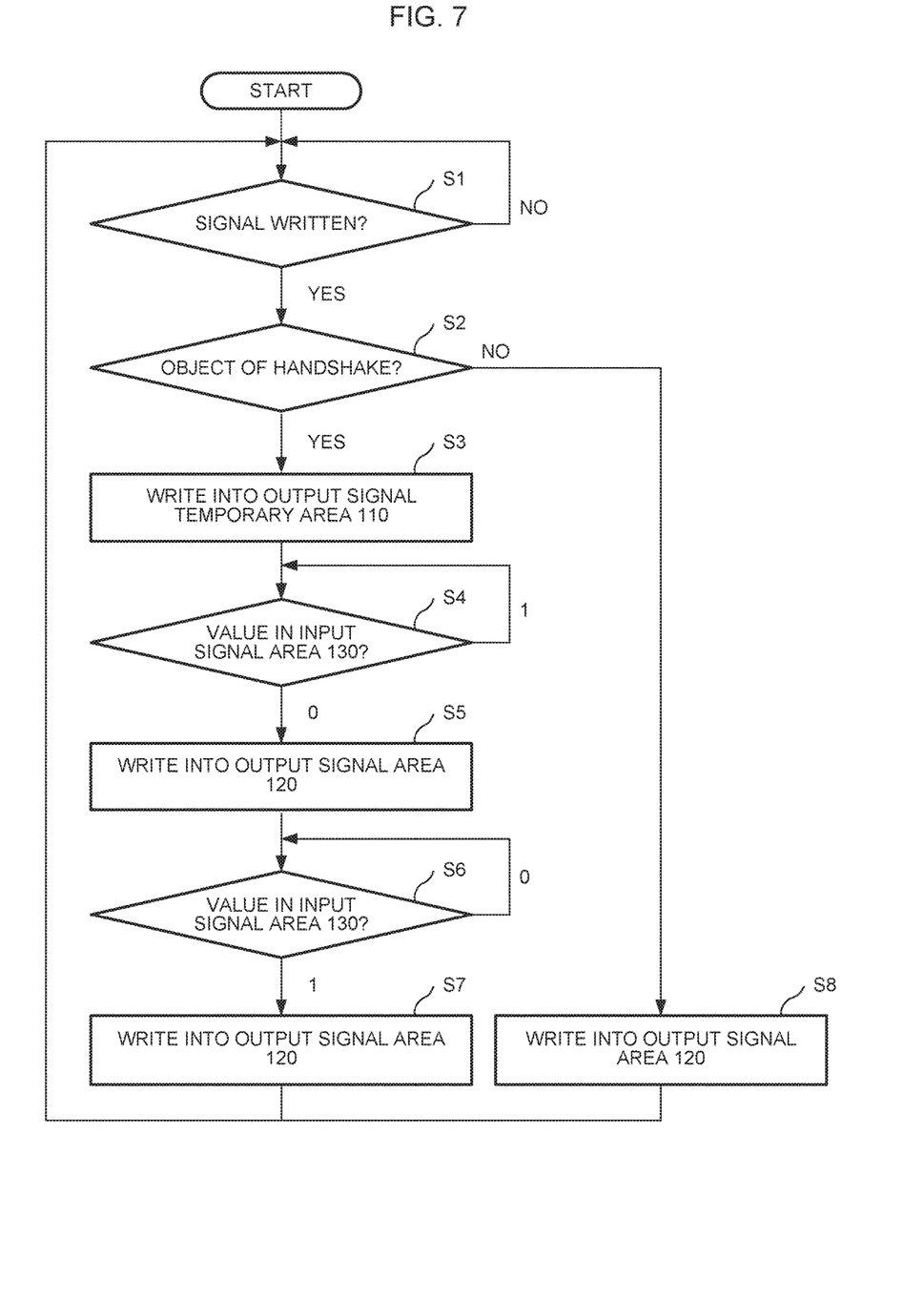
FIG. 7 is a flowchart showing an operation of the programmable controller.

An operation of the programmable controller 100 will now be described with reference to the flowchart of FIG. 7 and the time chart of FIG. 8.

S1 and S2: The handshake processing part 140 monitors an execution result (signal) output by the sequential program execution part 150. The handshake processing part 140 previously holds the type of the request signal as an object of the handshake processing. The handshake processing part 140 determines whether or not the signal output by the sequential program execution part 150 is the signal as the object of the handshake processing. If the signal is the object of the handshake processing, the processing proceeds to S3. If not, the processing proceeds to S8.

S3: The handshake processing part 140 writes an output signal from the sequential program execution part 150 into the output signal temporary area 110.

Figure 8:
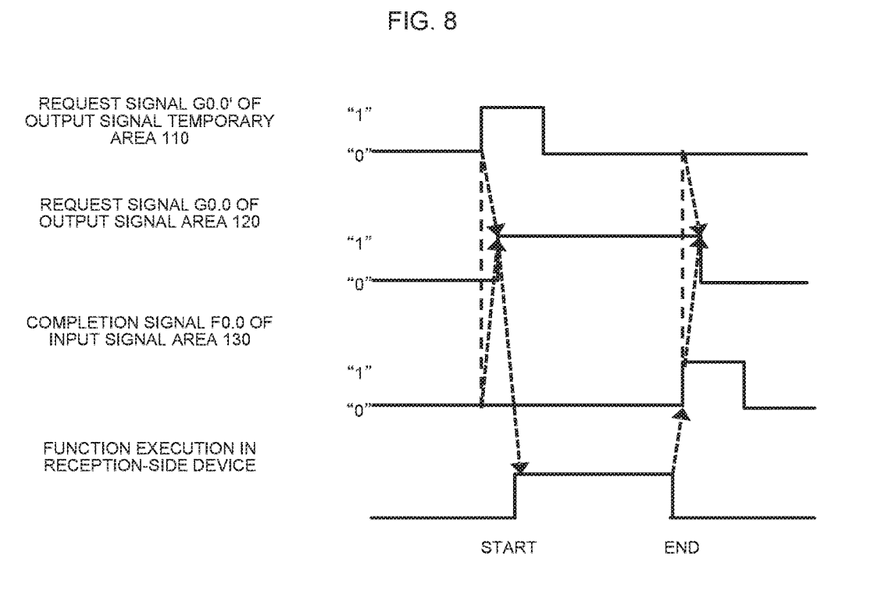
FIG. 8 is a time chart showing the operation of the programmable controller.

In the time chart of FIG. 8, a request signal G0.0' of the output signal temporary area 110 is changed from 0 to 1 by the processing in Step S3.

S4: The handshake processing part 140 determines whether the value in the input signal area 130 corresponding to the request signal written into the output signal temporary area 110 in Step S3 is 0 or 1. If the value in the input signal area 130 is 1, it is expected to become 0 after a standby. If the value in the input signal area 130 is 0, the processing proceeds to S5.

S5: The handshake processing part 140 writes the output signal from the sequential program execution part 150 into the output signal area 120.

In the time chart of FIG. 8, a request signal G0.0 of the output signal area 120 is changed from 0 to 1 by the processing in Step S5. With this as a turning point, the reception-side device starts a predetermined operation. The output of the request signal G0.0 is maintained by the handshake processing part 140 before the completion signal is received from the reception-side device. The output of the request signal G0.0' of the output signal temporary area 110 may be suitably stopped after the processing in Step S5. This implies that the subsequent steps of the handshake processing are taken over by the handshake processing part 140 having detected the request signal G0.0' of the output signal temporary area 110.

If it is necessary to refer to the output signal in subsequent steps of execution processing for the sequential program, the sequential program execution part 150 refers to the value in the output signal area 120, not in the output signal temporary area 110.

S6: The handshake processing part 140 monitors the input signal area 130 and determines whether the value in the input signal area 130 corresponding to the request signal written into the output signal area 120 is 0 or 1. If the value in the input signal area 130 is 0, it is expected to become 1 after a standby. If the value in the input signal area 130 is 1, the processing proceeds to S7. The handshake processing part 140 is assumed to have previously stored a storage area (not shown) with the correspondence between request signals and completion signals, that is, completion signals (F signals) generated corresponding to request signals (G signals).

In the time chart of FIG. 8, a completion signal F0.0 of the input signal area 130 is changed from 0 to 1 with the completion of the operation in the reception-side device as a turning point. With this completion signal F0.0 as a turning point, the output signal G0.0 of the output signal area 120 is changed from 1 to 0. This implies that the handshake processing part 140 has stopped the output of the request signal on completion of the operation in the reception-side device, that is, the handshake processing is completed.

S7: The handshake processing part 140 changes the value in the output signal area 120 from 1 to 0.

In the time chart of FIG. 8, the request signal G0.0 of the output signal area 120 is changed from 1 to 0 by the processing in Step S7. Moreover, since the reception-side device having detected this change changes the value in the output signal area from 1 to 0, the value in the input signal area 130 is also changed from 1 to 0, reflecting this change (conventional operation).

S8: The handshake processing part 140 writes the output signal from the sequential program execution part 150 into the output signal area 120.

Subsequently, the operation of the programmable controller 100 will be repeatedly described with reference to the schematic diagrams of FIGS. 9 to 16.

Figure 9:
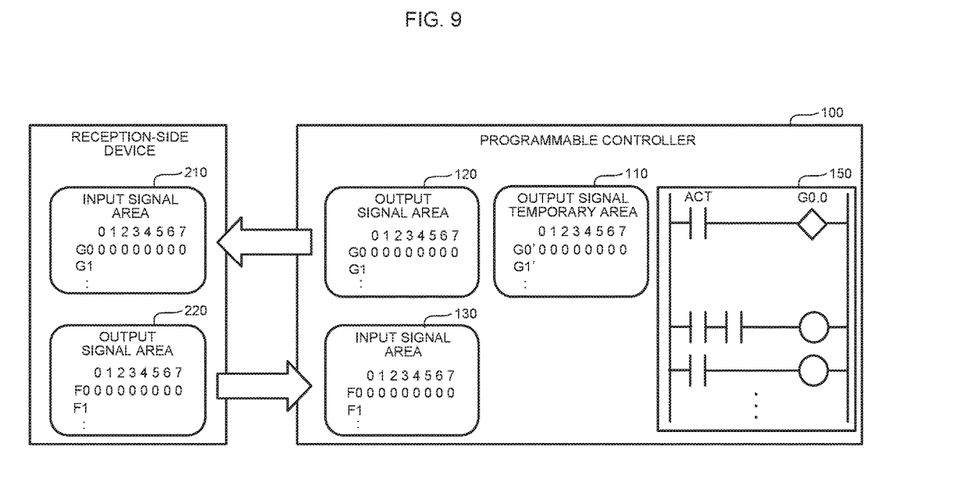
FIG. 9 is a diagram showing an operation of the programmable controller.

First, the programmable controller 100 is characterized in that it comprises the output signal temporary area 110 (FIG. 9). This is a novel constituent element that is not comprised by a conventional programmable controller.

Figure 10:
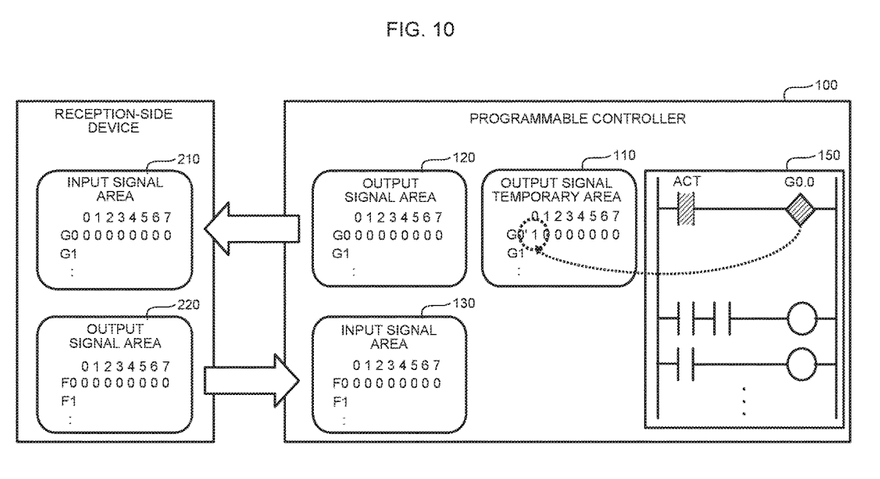
FIG. 10 is a diagram showing an operation of the programmable controller.

The sequential program execution part 150 executes a net in which G signals of the sequential program exist, that is, output instructions for request signals are involved. The sequential program execution part 150 writes the result of the execution of the net into the output signal temporary area 110 through the handshake processing part 140 (FIG. 10). In the example of FIG. 10, the sequential program execution part 150 rewrites G0.0' of the output signal temporary area 110 from 0 to 1.

Figure 11:
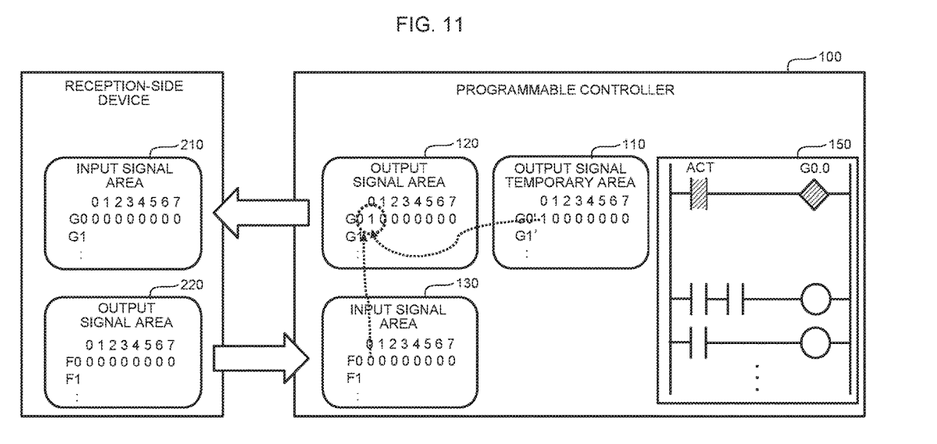
FIG. 11 is a diagram showing an operation of the programmable controller.

When the handshake processing part 140 detects that the signal of the output signal temporary area 110 has become 1, it confirms that the signal state of the input signal area 130 is 0. Thereafter, the signal state of the output signal temporary area 110 is copied in the output signal area 120 (FIG. 11).

Figure 12:
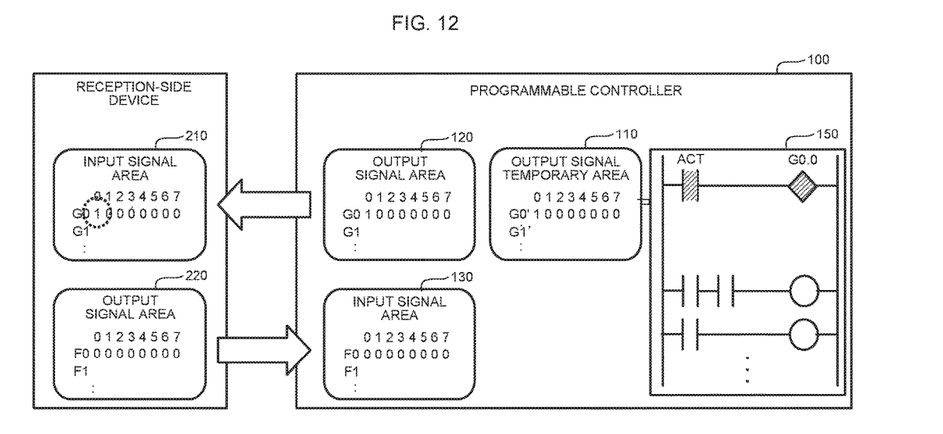
FIG. 12 is a diagram showing an operation of the programmable controller.

The signal state of the output signal area 120 is reflected in the input signal area 210 of the reception-side device. If the signal state of the input signal area 210 is 1, the reception-side device performs an operation corresponding to the signal concerned (FIG. 12). If the reception-side device is a numerical controller (CNC), for example, it can be made to change the tool of a machine tool. If the reception-side device is a robot controller, it can be made to perform an operation for urging a robot to move a workpiece.

Figure 13:
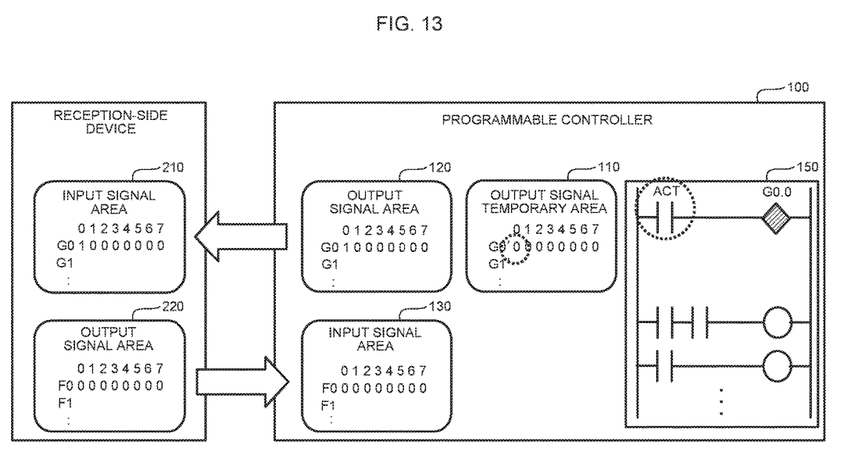
FIG. 13 is a diagram showing an operation of the programmable controller.

When the sequential program execution part 150 turns off ACT of the sequential program, thereby stopping the output of the G signals, the signal state of the output signal temporary area 110 changes from 1 to 0 (FIG. 13). Since the handshake processing part 140 has already copied and held the request signal in the output signal area 120, however, it can perform the subsequent steps of the handshake processing.

The reception-side device writes 1 into the output signal area 220 when the execution of the predetermined operation is completed.

Figure 14:
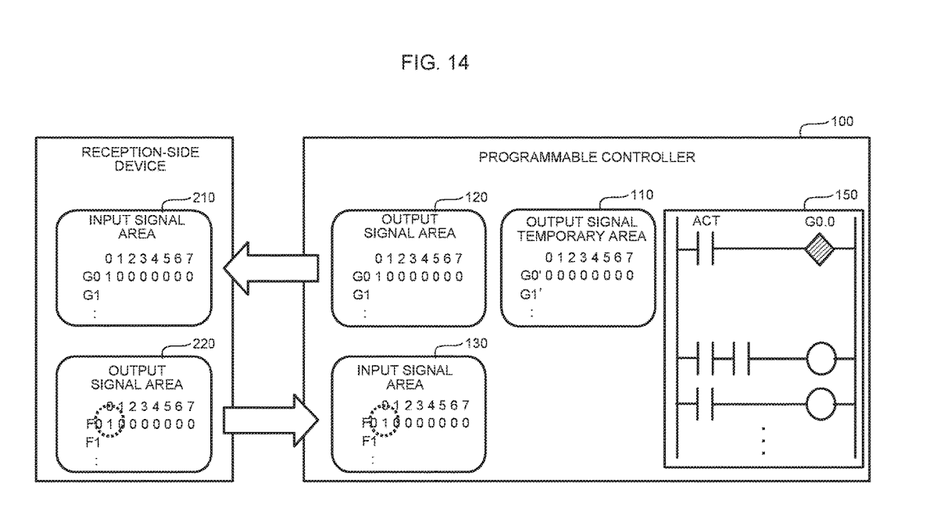
FIG. 14 is a diagram showing an operation of the programmable controller.

The signal state of the output signal area 220 is reflected in the input signal area 130 of the programmable controller 100 (FIG. 14).

Figure 15:
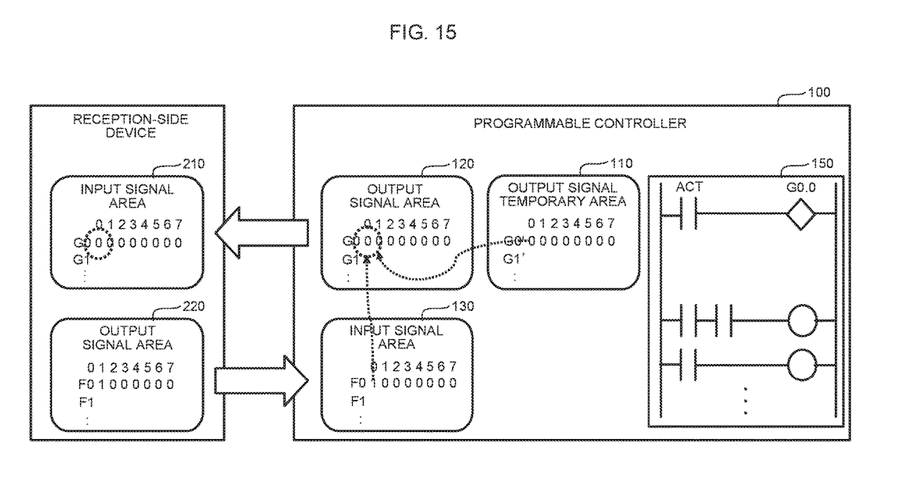
FIG. 15 is a diagram showing an operation of the programmable controller.

When the input signal area 130 is set to 1, the handshake processing part 140 refers to the signal state of the output signal temporary area 110. If the signal state of the output signal temporary area 110 is 0, the signal state of the output signal area 120 is changed to 0 (FIG. 15).

Figure 16:
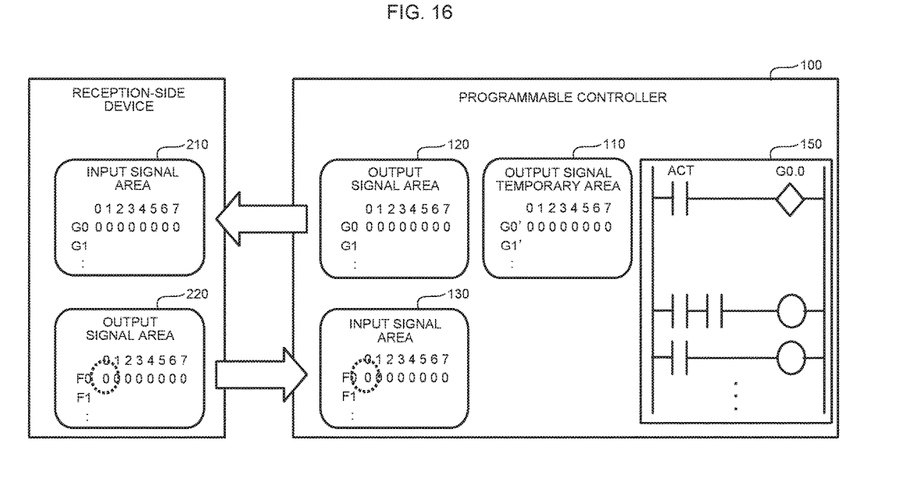
FIG. 16 is a diagram showing an operation of the programmable controller.

The signal state of the output signal area 120 is reflected in the input signal area 210 of the reception-side device. When the reception-side device detects that the signal state of the input signal area 210 has become 0, it changes the signal state of the output signal area 220 to 0. The signal state of the output signal area 220 is reflected in the input signal area 130 (FIG. 16).

According to the present embodiment, when the sequential program execution part 150 writes the request signal into the output signal temporary area 110, the handshake processing part 140 executes a series of steps of the handshake processing. Thus, the sequential program execution part 150 need not have a logic for handshake, so that the sequential program can be simplified.

The present invention is not limited to the above-described embodiment and may be suitably changed without departing from the spirit of the invention. Any of the constituent elements of the embodiment may be modified or omitted without departing from the scope of the present invention.

For example, the request signals (G0.0, G0.0'), completion signal (F0.0), and signal states (0, 1) according to the above-described embodiment are given as examples only, and it is to be understood that the present invention is also applicable to some other signals and signal states.

While an embodiment of the present invention have been described herein, the invention is not limited to the above-described embodiment and may be suitably modified and embodied in various forms.

The invention claimed is:

1. A programmable controller configured to perform handshake processing in conjunction with a reception-side device, the programmable controller comprising:

an output signal area in which a signal to be output to the reception-side device is held;

an input signal area in which a signal output by the reception-side device is held;

a sequential program execution part configured to execute a sequential program;

an output signal temporary area in which an output signal from the sequential program is held; and a handshake processing part configured to
copy a signal state of the output signal temporary area to the output signal area, and
hold the signal state of the output signal area so that the input signal area is notified of a completion signal.

2. The programmable controller according to claim 1, wherein
after the signal state of the output signal temporary area is copied to the output signal area, the sequential program execution part is configured to change the signal state of the output signal temporary area before the input signal area is notified of the completion signal.

3. The programmable controller according to claim 1, wherein
the handshake processing part is configured to
determine whether or not the output signal from the sequential program is a signal that requires handshake processing, and
cause the output signal from the sequential program to be held in the output signal temporary area in response to a determination that the output signal is a signal that requires the handshake processing.

4. The programmable controller according to claim 3, wherein
the handshake processing part is configured to
cause the output signal from the sequential program to be held in the output signal area in response to a determination that the output signal is a signal that does not require the handshake processing.

5. The programmable controller according to claim 1, wherein
the handshake processing part is configured to
copy the signal state of the output signal temporary area to the output signal area when the completion signal is not held in the input signal area.

6. The programmable controller according to claim 1, wherein
the handshake processing part is configured to
hold the signal state of the output signal area until the input signal area is notified of the completion signal received from the reception-side device.

7. The programmable controller according to claim 1, wherein the handshake processing part is configured to
determine whether or not the output signal from the sequential program is a signal that requires handshake processing,
in response to a determination that the output signal from the sequential program is a signal that does not require the handshake processing,
write the output signal into the output signal area, and
in response to a determination that the output signal from the sequential program is a signal that requires the handshake processing,
write the output signal into the output signal temporary area,
copy the signal state of the output signal, that has been written into the output signal temporary area, to the output signal area, causing the reception-side device to start a predetermined operation,
after the signal state of the output signal temporary area has been copied to the output signal area,
change the signal state of the output signal temporary area before the input signal area is notified of the completion signal received from the reception-side device upon completion of the predetermined operation, and
hold the signal state of the output signal area until the input signal area is notified of the completion signal received from the reception-side device.

* * * * *